June 21, 1960  H. J. FLAJOLE, JR., ET AL  2,941,826
WINDSHIELD WIPER CLUTCH
Filed Oct. 28, 1957
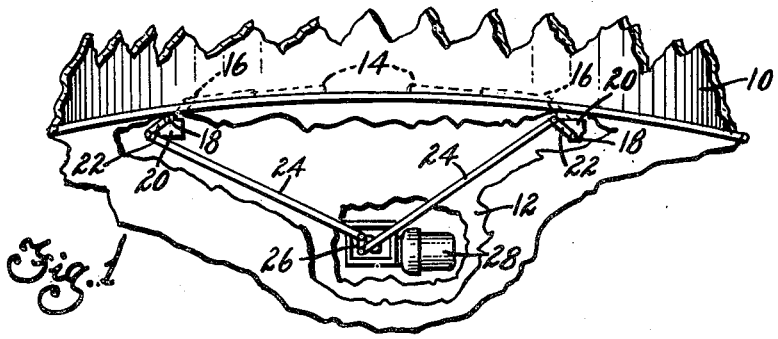
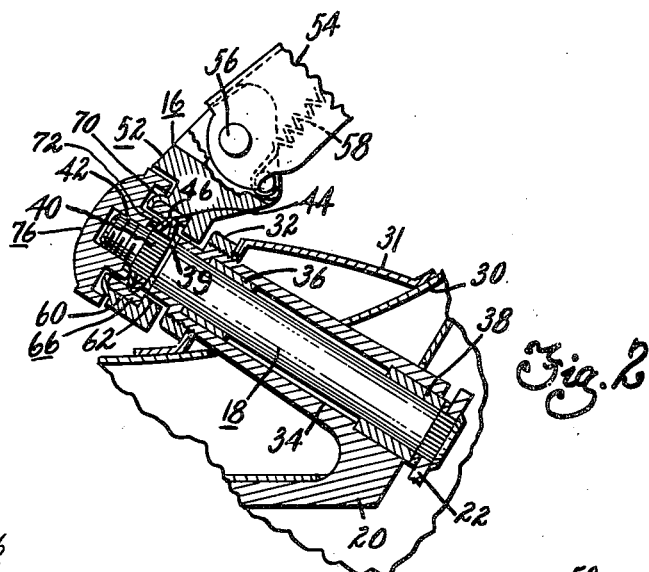
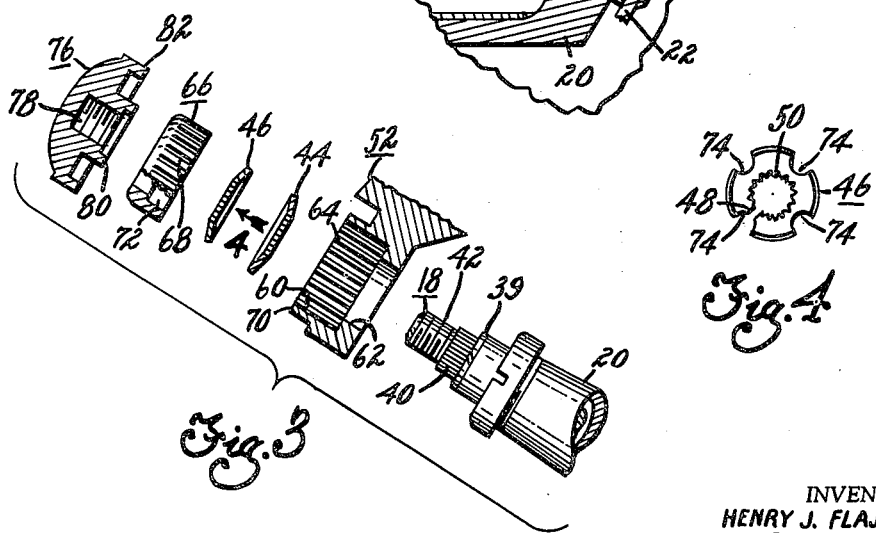
INVENTORS
HENRY J. FLAJOLE JR.
ROBERT M. FOX
BY
D. C. Staley
THEIR ATTORNEY United States Patent Office 2,941,826
Patented June 21, 1960

2,941,826

WINDSHIELD WIPER CLUTCH

Henry J. Flajole, Jr., Utica, and Robert M. Fox, Detroit, Mich., assignors to General Motors Corporation, Detroit, Mich., a corporation of Delaware Filed Oct. 28, 1957, Ser. No. 692,704

9 Claims. (Cl. 287—53)

This invention pertains to windshield wipers, and particularly to an improved clutch assembly for use between a windshield wiper arm and its driving shaft.

It is well recognized that with electric motor driven wiper mechanism, wherein rotary movement is obtained through speed reducing means including a worm and a worm gear, which rotary movement is converted to oscillation through rigid connecting links and crank arms, manual rotation of the wiper arms will result in damage to the driving mechanism. This invention relates to friction clutch means interposed between a wiper arm and its driving shaft, which clutch means permit manual movement of the arm relative to the shaft by clutch slippage without damaging the driving mechanism. In addition, the clutch means can be released to adjust the arm to any exact angular position thereby facilitating alignment of both wiper arms.

Accordingly, among our objects are the provision of friction clutch means for establishing a driving connection between a wiper arm and a pivot shaft; the further provision of friction clutch means of the aforesaid type including means for adjusting the clutch means to obtain a torque loading greater than the stall torque of the wiper motor; the further provision of friction clutch means of the aforesaid type including means for releasing the clutch means to permit infinite angular adjustment between the wiper arm and the pivot shaft; the further provision of windshield cleaning apparatus including friction clutch means; and the still further provision of a transmission and arm assembly including friction clutch means.

The aforementioned and other objects are accomplished in the present invention by embodying a pair of spring washers in the clutch mechanism. Specifically, the wiper assembly disclosed herein includes a stationary housing, attached to the cowl portion of a vehicle, and having a pair of spaced sleeve bearings therein. A transmission, or pivot, shaft is rotatably supported by the sleeve bearings, both ends of the shaft extending outside of the housing. The inner end of the shaft has a crank arm rigidly connected thereto, the crank arm being rotatably connected to a driving link actuated by an electric motor. The outer end of the shaft has an axially serrated portion and a threaded portion.

The driving shaft is adapted to be connected with a wiper arm having an inner, or socket, section and an outer section. The two arm sections are pivotally interconnected on an axis transverse to the axis of the driving shaft, and are also interconnected by a spring which urges the outer arm section towards the windshield, and thus applies wiping pressure to a wiper blade carried thereby. The socket section has a stepped bore, a portion of which is serrated. The larger diameter portion of the stepped bore receives an annular clutch housing having external serrations. The clutch housing and the socket section are assembled by spinning a peripheral edge of the socket section over the clutch housing.

A pair of opposed, split, Belleville washers are disposed in the annular groove between the clutch housing and the shaft. The washers have serrated openings which mate with the serrations on the shaft. The outer edges of the washers are notched to provide a plurality of contact edges. The washers are pressed together and expanded by a spanner nut which is received by the threaded portions of the shaft. A predetermined force is imposed on the washers by the nut to create a frictional torque, which torque is greater than the stall torque of the wiper motor whereby the clutch will not slip when the motor is running.

The arm can be accurately adjusted relative to the windshield for locating the depressed parked position merely by loosening the spanner nut to release the clutch. Thereafter, the spanner nut is tightened to the aforesaid predetermined torque. Moreover, if the wiper arm is manually turned when the wiper motor is not running, such as during cleaning of the windshield, the friction clutch will slip thereby preventing damage to the driving mechanism.

Further objects and advantages of the present invention will be apparent from the following description, reference being had to the accompanying drawing wherein preferred embodiments of the invention are clearly shown.

In the drawing:

Figure 1 is a fragmentary view, partly in section and partly in elevation, of a vehicle including windshield cleaning mechanisms having the clutch assembly of this invention.

Figure 2 is a fragmentary view, partly in section and partly in elevation, illustrating a transmission and arm assembly constructed according to the present invention.

Figure 3 is an exploded view of the component parts of the clutch assembly.

Figure 4 is a view, in elevation, taken in the direction of arrow 4 of Figure 3.

With particular reference to Figure 1, a portion of a vehicle is shown including a windshield 10, and a firewall 12. The vehicle includes windshield cleaning apparatus comprising a pair of wiper blades 14 carried by wiper arms 16, the wiper arms being movable over asymmetrical paths so as to clean the outer surface of the windshield 10. The wiper arms 16 are drivingly connected, in a manner to be described more particularly hereinafter, to spaced pivot, or transmission, shafts 18 rotatably supported in housings 20.

The transmission shafts 18 have rigidly connected thereto crank arms 22, the outer ends of which are rotatably connected to the ends of rigid connecting links 24. The inner ends of the connecting links 24 are rotatably connected to rotatable crank assembly 26 driven by an electric motor 28 through a worm and worm gear speed reduction unit, not shown. The driving mechanism may be of the type disclosed in copending application Serial Number 686,432, filed September 26, 1957, in the name of Harry W. Schmitz, and assigned to the assignee of this invention. Accordingly, the wiper blades 14 are movable throughout a wiping stroke during energization of the motor 28, and are automatically moved to a depressed parked position against the lower rail of the windshield when the motor 28 is deenergized. In order to impart asymmetrical movement to the wiper blades 14 from a single crank assembly 26, the lefthand connecting link 24 extends below its respective pivot shaft 18, while the righthand connecting link 24 extends above its pivot shaft 18.

With particular reference to Figures 2 through 4, the transmission housing 20 extends through the cowl portion 30 of the vehicle and is rigidly attached thereto by bolts, not shown. A nut 32 threadedly engages the housing for holding an escutcheon plate 31 on the cowl portion 30. The housing 20 has a through bore 34 within which a pair of spaced sleeve bearings 36 and 38 are disposed. The driving shaft 18 is rotatably supported by the spaced sleeve bearings and projects outside of each end of the housing 20. The inner end of the shaft 18 has the crank arm 22 rigidly attached thereto, and the shaft 18 is restrained against axial movement by the crank arm 22 and a snap ring 39. The outer end of the shaft 18, as seen particularly in Figure 3, has an axially serrated portion 40 and a threaded portion 42 of smaller diameter than the serrated portion.

The axially serrated portion 40 receives a pair of opposed spring washers 44 and 46, of the Belleville type. As seen in Figure 4, the Belleville washers 44 and 46 are radially split as indicated by numeral 48 to facilitate expansion, and have serrated openings indicated by numeral 50. The serrations of the openings 50 mate with the serrations 40 on the shaft 18. Thus, the spring washers 44 and 46 are drivingly connected to the shaft 18 at all times.

The wiper arm 16 includes an inner, or socket, section 52 and outer section 54. The inner and outer sections are interconnected by pivot pin 56 and a spring 58, the spring 58 urging the outer section 54 towards the windshield 10. The socket section 52, as seen particularly in Figure 3, is formed with a stepped bore including a larger diameter portion 60 and a smaller diameter portion 62. The larger diameter portion 60 has internal axial serrations, or splines, 64. The diameter of the portion 62 is slightly greater than the outer diameter of the housing 20 which it circumscribes, as seen in Figure 2. A clutch housing 66, in the form of an annulus having external axial serrations 68, is assembled within the larger diameter bore portions 60, such that the serrations 68 mate with the serrations 64. Thus, the clutch housing 66 is drivingly connected at all times with the socket section 52. In order to prevent axial movement of the clutch housing 66 relative to the socket section 52, the peripheral edge 70 of the socket section is spun over the clutch housing 66 as indicated in Figure 2. It is noted that in the assembly, the spring washers 44 and 46 are disposed in the annular groove 72 between the serrated portion 40 of the shaft 18 and the smooth inner diameter of the clutch housing 66.

It is further pointed out that, as shown in Figure 4, the outer edge of each spring washer has four notches 74 for relieving the stress in the washers and facilitating collapse thereof by the force of the spanner nut 76. The arm 16 is maintained in assembled relation with the shaft 18 by a spanner nut 76 which has a threaded opening 78 designed to receive the threads 42 on the shaft 18. It is pointed out that the spanner nut 76 has inner and outer radially spaced, axially extending skirt portions 80 and 82. The skirt portion 80 extends through the clutch housing 66 and engages the spring washer 46 for pressing the washers 44 and 46 together so as to expand the washers 44 and 46 into frictional engagement, or circumferential bind, with the inner surface of the clutch housing. The outer skirt 82 overlaps a portion of the socket section 52 in a manner designed to prevent the entrance of water, or other foreign matter, into the annular groove 72. In addition, the socket section 52 overlaps the housing 20 to exclude foreign matter from the sleeve bearings 36 and 38. Thus, both the spring washers and the sleeve bearings are substantially weatherproofed.

The spaner nut 76 is tightened to apply a longitudinal force on the washers, so that the washers have a predetermined frictional torque, which torque is greater than the stall torque of the electric motor 28. Accordingly, when the electric motor 28 is running, oscillatory movement imparted to the driving shafts 18 by rotation of the crank means 26 through the links 24 and crank arms 22 will impart oscillation to the wiper arms 16 and the blades 14 through the frictional driving connection established between the spring washers 44 and 46 and the clutch housings 66. However, when the motor 28 is not running, and the wiper arms 16 are manually rotated from the parked position the predetermined torque imposed on the spring washers 44 and 46 will be exceeded so as to cause slippage between the clutch housing and the spring washers. This clutch slippage will prevent damage, or breakage, which would otherwise occur to the driving mechanism, including the crank arms 22, the links 24 and the crank means 26, if the clutch means were not embodied in the cleaning apparatus.

In addition, the aforedescribed assembly facilitates precise adjustment of the wiper arms and blades with respect to each other to assure proper depressed parking of the wiper blades. In other words, each arm can be infinitely angularly adjusted relative to the shaft 18, merely by loosening the spanner nut 76 to release the clutch, and after the arm has been adjusted, tightening the spanner nut 76 to attain the predetermined torque loading of the spring washers. By incorporating a pair of spring washers, the spanner nut 76 will not be loosened by slipping the clutch means when the motor 28 is deenergized, since the slipping surface is between both washers and the clutch housing.

While the embodiment of the invention as herein disclosed constitute a preferred form, it is to be understood that other forms might be adopted.

What is claimed is as follows:

1. In a windshield cleaning apparatus, in combination, a rotatable shaft, means for imparting angular movement to said shaft, a wiper arm, friction clutch means interposed between said wiper arm and said shaft including a pair of opposed spring washers, and adjustable means connected to said shaft and directly engageable with at least one of said spring washers to cause expansion of said spring washers into frictional engagement with said arm to establish a driving connection between said shaft and said wiper arm.

2. The apparatus set forth in claim 1 wherein said last recited means comprises a nut threadedly engaging said shaft, said nut being tightened to impose a torque on said spring washers which exceeds the stall torque of the means for imparting angular movement to said shaft.

3. A transmission and arm assembly for a windshield wiper including, a rotatable shaft, a wiper arm, friction clutch means interposed between said shaft and said arm including a pair of opposed spring washers, and adjustable means attached to said shaft and directly engageable with at least one of said spring washers for effecting expansion of said washers to establish a frictional driving connection between said washers and said arm.

4. A transmission and arm assembly for a windshield wiper including, a rotatable shaft, a wiper arm, a pair of spring washers drivingly connected with said shaft, a clutch housing coaxial with said shaft and radially spaced therefrom having a driving connection with said arm, and means attached to said shaft and extending into said clutch housing so as to be directly engageable with at least one of said spring washers for urging said spring washers into frictional engagement with said clutch housing to establish a driving connection between said washers and said clutch housing.

5. A transmission and arm assembly for a windshield wiper including, a rotatable shaft having an axially serrated portion, a wiper arm, a pair of spring washers having serrated openings mating with the serrations on said shaft, a clutch housing drivingly connected to said arm and having an inner surface radially spaced from said shaft, and means attached to said shaft and extending into said clutch housing so as to be directly engageable with at least one of said spring washers for effecting expansion of said spring washers into frictional engagement with said clutch housing to establish a frictional driving connection therebetween.

6. A transmission and arm assembly for a windshield wiper including, a rotatable shaft having an axially serrated portion, a wiper arm, a pair of spring washers having serrated openings mating with the serrations on said shaft, a clutch housing drivingly connected to said arm by mating axial serrations and having an inner surface radially spaced from said shaft, and means attached to said shaft and engageable with at least one of said spring washers for effecting expansion of said spring washers into frictional engagement with said clutch housing to establish a frictional driving connection therebetween.

7. The assembly set forth in claim 6 wherein said wiper arm includes pivotally interconnected inner and outer sections, and wherein the inner section is drivingly connected to said clutch housing and includes a peripheral edge portion which is spun over an end of said clutch housing to preclude relative axial movement therebetween.

8. A transmission and arm assembly for a windshield wiper including, a rotatable shaft having an axially serrated portion, a wiper arm, a pair of spring washers having serrated openings mating with the serrations on said shaft, a clutch housing drivingly connected to said arm and having an inner surface radially spaced from said shaft, and a nut threadedly engaging said shaft having an axially extending skirt portion disposed within said clutch housing and engaging one of said spring washers for effecting expansion of said spring washers into frictional engagement with said clutch housing to establish a frictional driving connection therebetween.

9. An assembly for a windshield wiper including, an inner arm section, a clutch housing rigidly attached to said inner arm section, a pair of opposed spring washers disposed within said clutch housing having apertures for receiving a shaft and having serrations about the apertures for effecting a driving connection with the shaft, said clutch housing comprising an annular member coaxial with and radially spaced from said shaft, and a nut attached to said shaft having a portion extending into said annular clutch housing and directly engageable with one of said spring washers for applying pressure to said spring washers to effect expansion thereof into frictional engagement with said clutch housing.

References Cited in the file of this patent

UNITED STATES PATENTS

| | | |
|---|---|---|
| 2,317,245 | Bell | Apr. 20, 1943 |
| 2,806,557 | Finken | Sept. 17, 1957 |

FOREIGN PATENTS

| | | |
|---|---|---|
| 764,101 | Great Britain | Dec. 19, 1956 |